United States Patent
Yamamura

(10) Patent No.: US 6,504,276 B2
(45) Date of Patent: Jan. 7, 2003

(54) MOTOR ACTUATOR HAVING SIMPLIFIED INTERFITTING CONNECTION

(75) Inventor: Kengo Yamamura, Inasa-gun (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/769,427

(22) Filed: Jan. 26, 2001

(65) Prior Publication Data

US 2001/0011848 A1 Aug. 9, 2001

(30) Foreign Application Priority Data

Feb. 4, 2000 (JP) .................................. 2000-027519

(51) Int. Cl.⁷ .................................................. G01D 5/02
(52) U.S. Cl. ................. 310/75 D; 310/68 B; 310/75 R; 310/112; 464/112
(58) Field of Search ........................ 464/112; 310/75 D, 310/112, 25 R, 68 B

(56) References Cited

U.S. PATENT DOCUMENTS

| | | | |
|---|---|---|---|
| 1,764,263 A | * 6/1930 | Johnson | 192/41 R |
| 3,854,063 A | * 12/1974 | Bergman | 310/75 D |
| 4,804,874 A | * 2/1989 | Nakamura | 192/110 R |
| 5,569,022 A | * 10/1996 | Rossi | 310/78 |
| 5,773,947 A | 6/1998 | Torii et al. | 318/466 |
| 5,818,358 A | 10/1998 | Torii et al. | 341/16 |

FOREIGN PATENT DOCUMENTS

JP    Y2-52-11601    3/1977

* cited by examiner

Primary Examiner—Burton S. Mullins
(74) Attorney, Agent, or Firm—Law Offices of David G. Posz

(57) ABSTRACT

In a connection between a motor and a position detector that together constitute a motor actuator, a connection shaft of the position detector is engaged with an outer peripheral surface of a motor output shaft, and a shaft portion of the connection shaft is engaged with an inner peripheral surface of the motor output shaft. Furthermore, radial recesses are provided to be radially outwardly recessed from the inner peripheral surface of the motor output shaft, and one of radial recesses of the motor output shaft engages with a single radial projection of the shaft portion of the connection shaft. Thus, the motor output shaft and the connection shaft are non-rotatably connected with each other, readily accurately.

9 Claims, 5 Drawing Sheets

MOTOR ACTUATOR HAVING SIMPLIFIED INTERFITTING CONNECTION

CROSS-REFERENCE TO RELATED APPLICATION

This application is related to and claims priority from Japanese Patent Application No. 2000-27519 filed on Feb. 4, 2000, the contents of which are hereby incorporated by reference.

BACKGROUND OF THE INVENTION

1. Field of the Invention

The present invention relates to a motor actuator used, for example, in a power window device that moves a window glass of a vehicle door up and down or in a sunroof device that moves a sunroof panel forward and backward.

2. Description of Related Art

Generally, a power window device and a sunroof device have a motor as a drive source. For instance, JP-A-8-29114 and JP-A-9-236431 respectively disclose a motor actuator having a feature capable of detecting a rotational position of an output shaft of such a motor, i.e., a position of a window glass or a sunroof panel.

The above-disclosed motor actuator has a motor and a position detector that are connected with each other. The position detector includes a planetary gear train unit, a switch portion and a clutch mechanism. The planetary gear train unit has a ring gear rotatably supported within a cover plate, planetary gears meshed with the ring gear and a sun gear. The switch portion includes moving contacts and fixed contacts. The moving contacts are integrally formed in the ring gear of the planetary gear train unit to rotate therewith. The fixed contacts are fixed to the cover plate and are allowed to engage with the corresponding moving contacts. The clutch mechanism disables transmission of a rotational force from the moving body (output shaft of the motor) to the ring gear in a forward direction. Furthermore, the position detector includes a sensor drive shaft for driving the ring gear. The sensor drive shaft has the sun gear integrated therein and is connected to the motor output shaft of the motor. Thus, when the motor output shaft is rotated, the ring gear is rotated integrally with the moving contacts. The rotation of the moving contacts causes activation of the switch portion. The activation of the switch portion allows detection of a rotational position of the motor output shaft, i.e., a position of the window glass or the sunroof panel.

In the above-described motor actuator, the motor output shaft and the sensor drive shaft are connected with each other by a complex interfitting structure (geometrically complex) to synchronously (integrally) rotate the sun gear with the moving body, such as the motor output shaft. That is, the motor output shaft has a hollow structure including axial splines around its outer peripheral surface to form a spline interfitting portion. The sensor drive shaft has a corresponding spline interfitting portion that meshes with the spline interfitting portion of the motor output shaft. To guide the engagement between the two spline interfitting portions, a plurality of axially extending guide grooves are formed in an inner peripheral surface of the motor output shaft. Furthermore, a cylindrical portion that can be interfitted within the motor output shaft is provided at a distal end of the sensor drive shaft, and a plurality of guide projections that correspond with the guide grooves are formed around an outer peripheral surface of the cylindrical portion. To couple the motor output shaft with the sensor drive shaft, the guide projections of the sensor drive shaft are inserted into the corresponding guide grooves of the motor output shaft, and the spline interfitting portion of the sensor drive shaft are meshed with the spline interfitting portion of the motor output shaft.

However, in the above-described interfitting structure used for the above motor actuator, a complicated and costly manufacturing process is required for manufacturing each interfitting portion with: a high degree of accuracy. Furthermore, interfitting positions of the guide grooves and the corresponding guide projections are closely related to interfitting positions of the spline interfitting portion of the motor output shaft and the spline interfitting portion of the sensor drive shaft. As a result, it is difficult to maintain a high degree of accuracy with respect to these interfitting positions and to prevent production of a defective motor output shaft or sensor drive shaft that cannot be properly interfitted With the corresponding sensor drive shaft or motor output shaft, resulting in higher costs.

SUMMARY OF THE INVENTION

In view of the foregoing problems, it is an object of the present invention to provide a motor actuator that is capable of detecting a position of a moving object, such as a window glass, a sunroof panel or the like, with a high degree of accuracy at low costs by use of a simple structure and that does not require a high quality control of an interfitting connection (engagement connection) between a motor output shaft and a sensor drive shaft to permit easy manufacturing and assembly of the motor output shaft and the sensor drive shaft.

To achieve the objective of the present invention, in a motor actuator including a motor and a position detector, an approximately cylindrical motor output shaft of the motor has a radial recess that recesses radially outward from an inner peripheral surface, a shaft portion of a sensor drive shaft of the position detector has a radial projection that protrudes from an outer peripheral surface of the shaft portion to be engaged with the radial recess. of the motor output shaft, and the motor output shaft and the sensor drive shaft are non-rotatably connected with each other by engagement of the radial recess of the motor output shaft with the radial projection of the sensor drive shaft. Accordingly, a connection between the motor and the position detector can be readily accurately performed by a simple structure. Thus, the motor output shaft and the sensor drive shaft can be readily manufactured and assembled in a low cost. As a result, when the motor actuator is applied to a moving object such as a window glass, a sunroof panel or the like, a position of the moving object can be readily accurately detected in low cost.

Preferably, an axial end portion of the radial projection is provided to be tapered toward its axial end. Therefore, when the motor output shaft and the sensor drive shaft are connected, the radial projection can be readily accurately fitted into the radial recess of the motor output shaft.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

Figure 1:
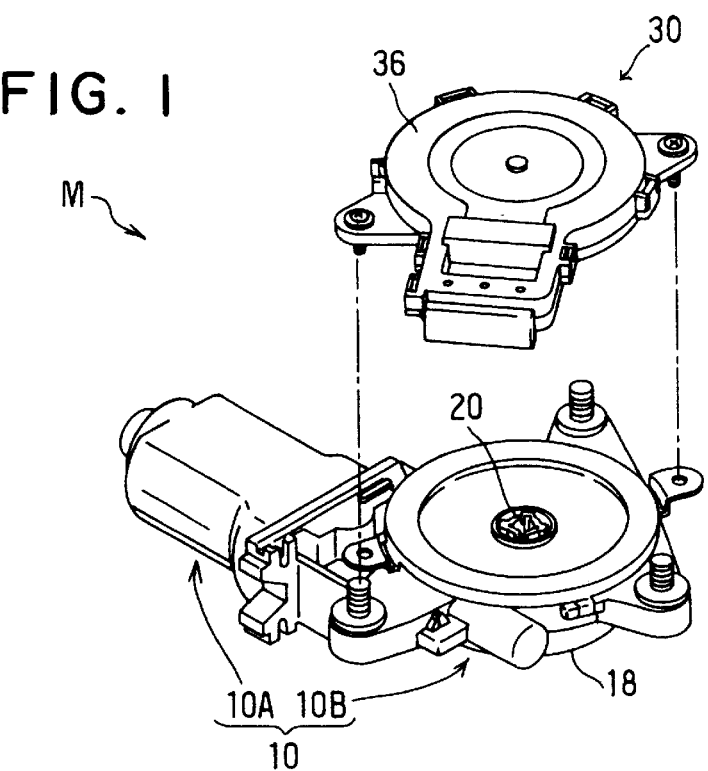
FIG. 1 is a perspective view of a motor actuator in a disassembled state according to a preferred embodiment of the present invention.
Figure 2:
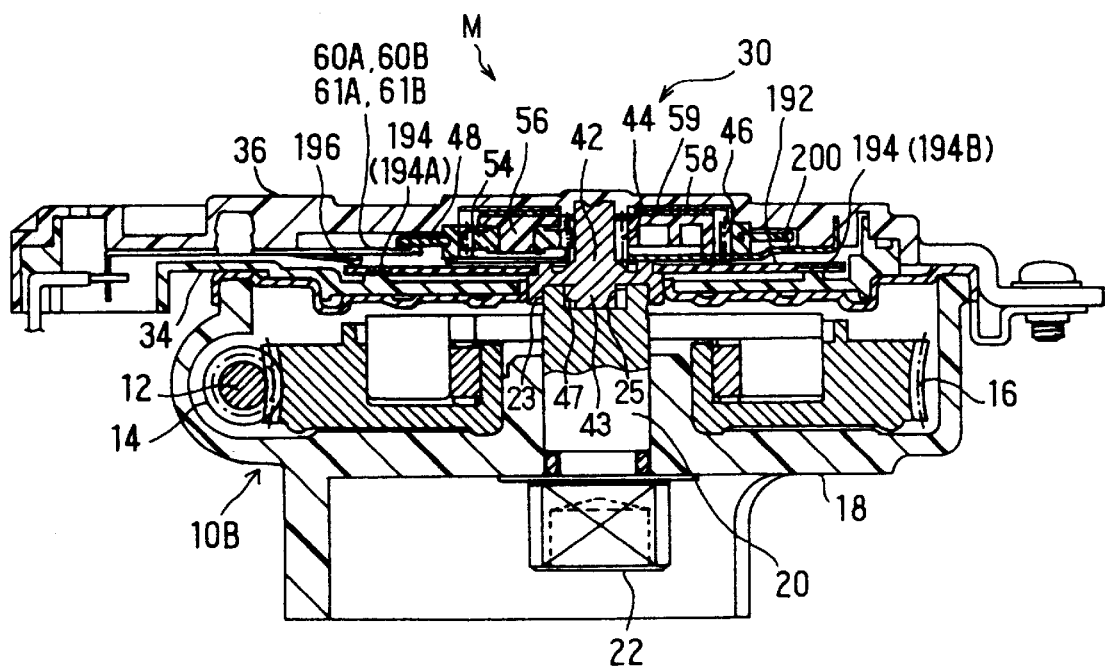
FIG. 2 is a cross-sectional view of the motor actuator according to the embodiment of the present invention.

As shown in FIGS. 1 and 2, a motor actuator M according to an embodiment of the present invention includes a motor 10 and a position detector 30.

The motor 10 includes a motor portion 10A and a gear portion 10B connected with each other. A rotation shaft 12 of the motor portion 10A extends into the gear portion 10B, and a worm gear 14 is provided at a top end of the rotation shaft 12. The worm gear 14 is meshed (engaged) with a rotation gear wheel 16 disposed in the gear portion 10B.

A motor output shaft 20 of the rotation gear wheel 16 is rotatably supported by a cover 18 of the gear portion 10B. When the motor portion 10A is driven to rotate the rotation shaft 12, a rotational force of the rotation shaft 12 is transmitted to the rotation gear wheel 16 through the worm gear 14 to rotate the motor output shaft 20. An output fitting portion 22 is provided at a distal end of the motor output shaft 20 and is connected to a driving portion of a window regulator (not shown). In the present embodiment, when the motor output shaft 20 (output fitting portion 22) rotates from 3 to 3.5 rotations, the window glass moves through one stroke.

An interfitting portion 23 is provided at the other end (i.e., the end opposite to the output fitting portion 22) of the motor output shaft 2b. As shown in detail in FIG. 5, the interfitting portion 23 of the motor output shaft 20 is shaped into a generally cylindrical form, and a plurality (e.g., four in this embodiment) of radial recesses 25 are formed in an inner peripheral surface of the interfitting portion 23. That is, the radial recesses 25 are recessed from the inner peripheral surface of the interfitting portion 23 radially outwardly.

The position detector 30 is attached to one side of the gear portion 10B where the interfitting portion 23 is located (i.e., the side opposite to the output fitting portion 22), as shown in FIG. 2.

Figure 3:
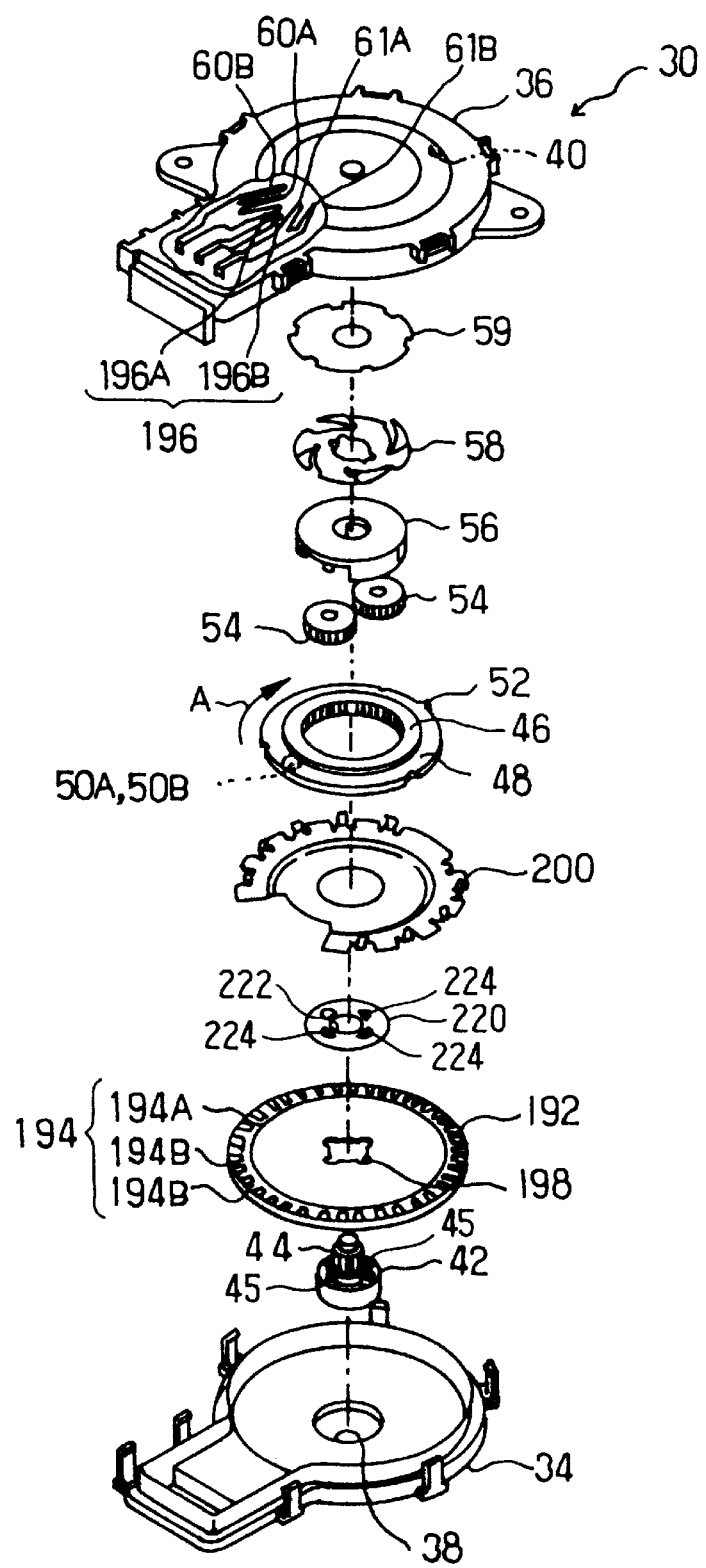
FIG. 3 is an exploded perspective view of a position detector of the motor actuator according to the embodiment of the present invention.

As shown in detail in FIG. 3, the position detector 30 has a base plate 34 and a cover plate 36 that together form a thin walled approximately cylindrical body when they are connected with each other. A through hole 38 penetrates through an axial center of the base plate 34. A protrusion 40 protrudes from an inner peripheral surface of the cover plate 36 in an axial direction.

Figure 5:
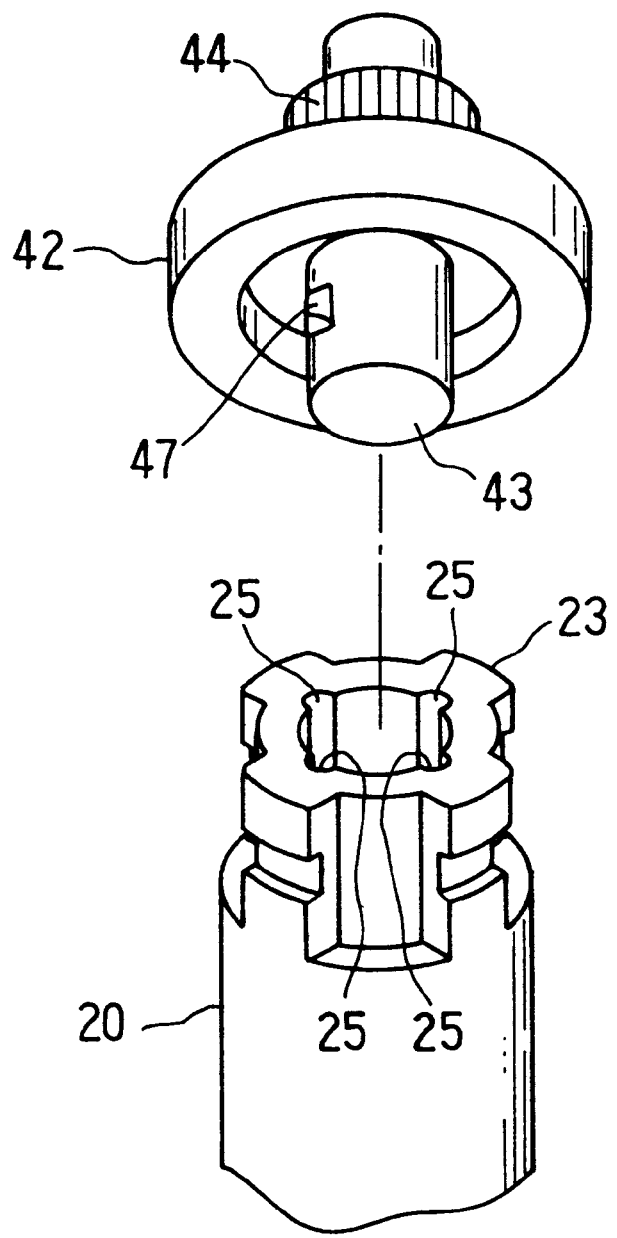
FIG. 5 is a partial perspective view showing a connection between a motor output shaft and a connection shaft in the motor actuator according to the embodiment of the present invention.

The position detector 30 further includes a connection shaft 42 constituting a sensor drive shaft. As shown in FIG. 5, the connection shaft 42 is shaped into a generally cylindrical form that corresponds to the interfitting portion 23 of the motor output shaft 20. The connection shaft 42 is disposed to be engaged with, an outer peripheral surface of the interfitting portion 23 of the motor output shaft 20. The connection shaft 42 has a shaft portion 43. The shaft portion 43 can be inserted into an inner peripheral surface of the motor output shaft 20 to be engaged therewith. A single radial projection 47 that corresponds with each one of the radial recesses 25 of the motor output shaft 20 extends radially outward from an outer peripheral surface of the shaft portion 43. By engaging the radial projection 47 with the radial recess 25, the motor output shaft 20 and the connection shaft 42 are non-rotatably connected with each other. An axial distal end portion of the radial projection 47 is tapered toward its axial distal end (toward the bottom side of FIG. 5) to allow easy insertion of the radial projection 47 into the corresponding radial recess 25.

As described above, the one end of the connection shaft 42 is integrally connected with the motor output shaft 20 of the rotation gear wheel 16 to always rotate integrally with the motor output shaft 20, and the other end of the connection shaft 42 is received in the interior of the position detector 30 (the interior defined by the base plate 34 and the cover plate 36) through the through hole 38 of the base plate 34.

A sun gear 44 is arranged at the other end of the connection shaft 42 and is meshed with a pair of planetary gears 54. The connection shaft 42 further includes a plurality of protrusions (four in this embodiment) 45 around the sun gear 44. The protrusions 45 are inserted into a fitting hole 198 of a pulse plate 192 and into corresponding connection holes 224 of a washer 220, as described in greater detail below.

Figure 4:
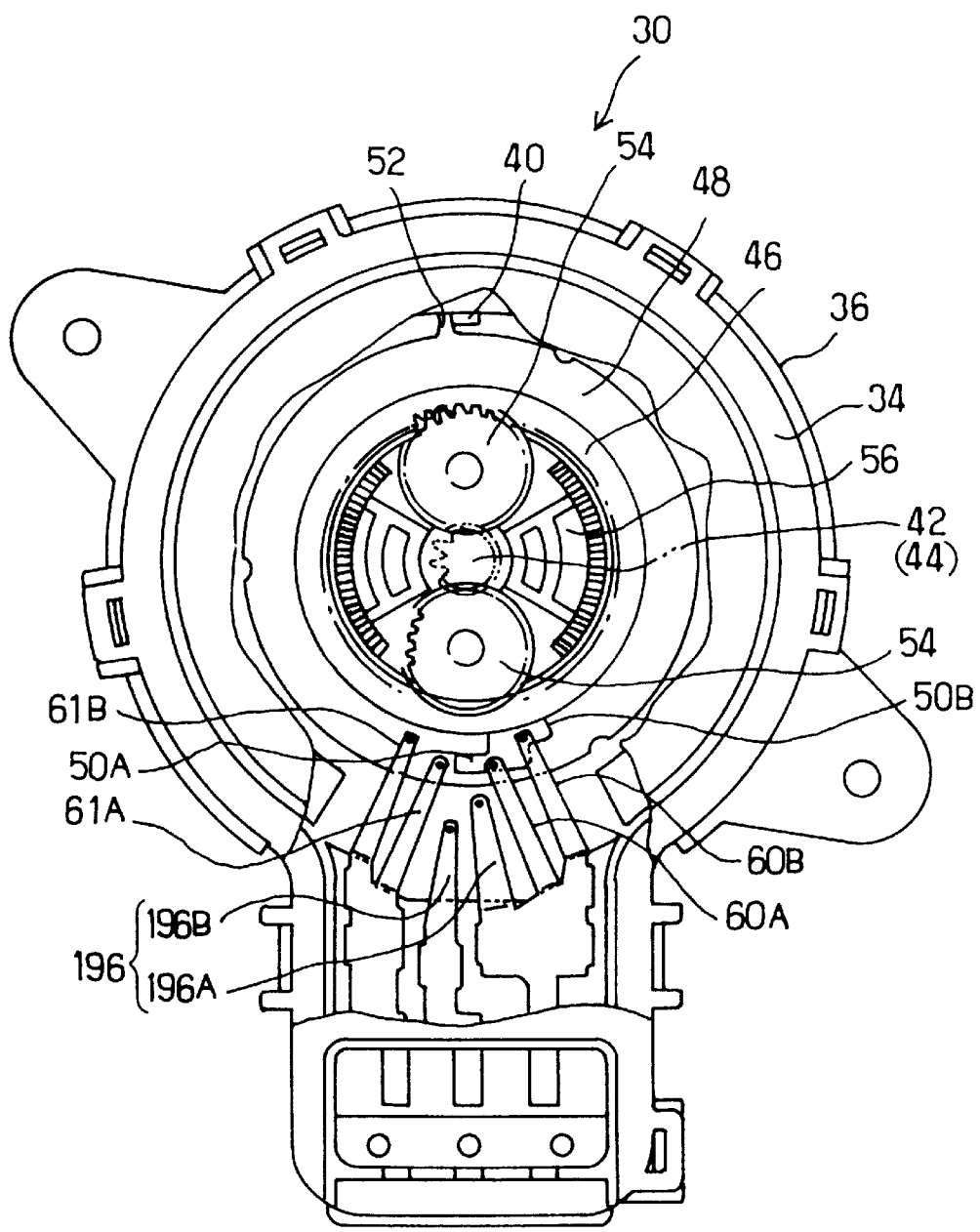
FIG. 4 is a partial cutaway plan view of the position detector of the motor actuator according to the embodiment of the present invention.

A ring gear 46 is disposed around the connection shaft 42 to radially oppose the sun gear 44. The ring gear 46 is rotatably held in the cover plate 36, and a flange portion 48 is integrally formed with an outer peripheral edge of the ring gear 46. The flange portion 48 is a conductive plate and has two moving contacts 50A and 50B at one side that is opposite to the cover plate 36. The moving contacts 50A and 50B are formed as arcuate step-like non-conductive portions and are substantially flat with the flange portion 48. Further, a protruding section 52 protrudes radially outward from an outer peripheral edge of the flange portion 48. The protruding section 52 corresponds with the protrusion 40 formed in the cover plate 36. The protruding section 52 contacts the protrusion 40 (the contact state is shown in FIG. 4) when the ring gear 46 (flange portion 48) rotates in the forward direction (in a direction of an arrow A in FIG. 3) and reaches a specified rotational position (the position shown in FIG. 4) to prevent further rotation of the ring gear 46 in the forward direction.

The planetary gears 54 are radially arranged between the ring gear 46 and the sun gear 44. These planetary gears 54 are rotatably supported by a carrier 56 and are meshed with the ring gear 46 and the sun gear 44. The sun gear 44, the ring gear 46 and the planetary gears 54 construct a planetary gear train unit, which transmits rotation of the connection shaft 42 (that is, the rotation of the motor output shaft 20) at a reduced speed. When the carrier 56 is held stationary, and thereby the revolution of each planetary gear 54 is prevented, the rotation of the connection shaft 42 (i.e., the rotation of the motor output shaft 20) is transmitted to the ring gear 46 at a reduced speed through the planetary gear train unit.

In this embodiment, a deceleration ratio or speed reduction ratio of the planetary gear train unit is 5.2:1, and the planetary gear train unit is so set that the ring gear 46 will not rotate for more than one rotation while the window glass moves through one stroke (while the sun gear 44 makes 3 to 3.5 rotations). The deceleration ratio of the planetary gear train unit is not limited to 5.2:1 and can be set to any value as desired.

The planetary gear train unit is covered by the cover plate 36. The planetary gear train unit is also retained by a protective plate 200 and is prevented from falling out of the cover plate 36 by the protective plate 200. A spring washer 58 and a washer 59 constitute a clutch mechanism and are disposed between the cover plate 36 and the carrier 56. The spring washer 58 is engaged with the carrier 56. Furthermore, the washer 59 is press-fitted into the cover plate 36 and engages an inner peripheral surface of the cover plate 36. The spring washer 58 engages the washer 59 while the spring washer 58 is axially compressed between the washer 59 and the carrier 56. Thus, the spring washer 58 continuously urges the carrier 56 against the protective plate 200. As a result, the rotation of the carrier 56 is normally prevented by the urging force of the spring washer 58 (i.e., by the frictional force between the carrier 56 and the protective plate 200) to prevent revolution of each planetary gear 54 around the sun gear 44. However, when the protruding section 52 of the flange portion 48 of the ring gear 46 contacts the protrusion 40 of the cover plate 36 to prevent further forward rotation of the ring gear 46, the forward rotational force of the sun gear 44 acts on the carrier 56 to overcome the urging force (holding force) of the spring washer 58. Thus, the spring washer 58 releases the carrier 56 and allows the revolution of each planetary gear 54 around the sun gear 44. That is, after the protruding section 52 of the flange portion 48 engages the protrusion 40, the transmission of the forward rotational force from the sun gear 44 (motor output shaft 20) to the ring gear 46 can be prevented by the spring washer 58. As a result, when the protruding section 52 engages the protrusion 40, and thereby the rotation of the ring gear 46 is prevented, the forward rotation of the sun gear 44 (the motor output shaft 20) causes only the planetary gears 54 to revolve.

With reference to FIGS. 3 and 4, two pairs of conductive fixed contacts 60A and 61A as well as 60B and 61B, each of which is made of an elastic contact plate, are secured to the cover plate 36. Among these fixed contacts 60A, 61A, 60B and 61B, the fixed contact 60A is formed integrally with the fixed contact 60B, and the fixed contact 61A is formed integrally with the fixed contact 61B. A base end of each fixed contact 60A, 61A, 60B or 61B is secured to the cover plate 36, and a distal end of the same fixed contact 60A, 61A, 60B or 61B extends to and :elastically contacts the flange portion 48 (at the side opposite to the cover plate 36) of the ring gear 46. That is, each fixed contact 60A, 61A, 60B or 61B is urged against the flange portion 48 (the moving contacts 50A and 50B) at the side opposite to the cover plate 36.

Each fixed contact 60A, 61A, 60B or 61B contacts the corresponding moving contact 50A or 50B at a specified rotational position of the ring gear 46. More specifically, the fixed contacts 60A and 61A are positioned to contact the radially outside moving contact 50A, and the fixed contacts 60B and 61B are positioned to contact the radially inside moving contact 50B.

Further, each fixed contact 60A, 61A, 60B or 61B is electrically connected to a control circuit (not shown) of the power window device. When,the non-conductive moving contacts 50A and 50B contact the conductive fixed contacts 60A and 60B, respectively, the conductive fixed contacts 60A and 60B are electrically insulated by the corresponding non-conductive moving contacts 50A and 50B. By detecting the insulated state of the fixed contacts 60A and 60B, it is possible to detect a rotational position of the ring gear 46 or a rotational position of the sun gear 44, i.e., a rotational position of the motor output shaft 20 that is used in a rotation control of the motor 10 (described in greater detail below).

In this embodiment, a size of each component is designed to satisfy the following conditions. That is, for example, when the window glass reaches a specified distance (e.g., 4 mm) away from an upper stop position of the window glass, the protruding section 52 is located at a specified angular position that is still away from an engaging position, in which the protrusion section 52 engages the protrusion 40. At this position, the moving contacts 50A and 50B initiate engagement with the fixed contacts 60A and 60B, respectively, and the fixed contacts 60A and 60B are electrically insulated by the moving contacts 50A and 50B. The fixed contacts 60A and 60B are kept insulated until the protrusion section 52 engages the protrusion 40.

Alternatively, the above-described construction can be modified as follows. That is, the flange portion 48 is made of dielectric material, and the moving contacts 50A and 50B are made of conductive material. When the window glass reaches the specified distance (e.g., 4 mm) away from the upper stop position of the window glass, the protruding section 52 is located at a specified angular position that is still away from the engaging position, in which the protrusion section 52 engages the protrusion 40. At this position, the conductive moving contacts 50A and 50B initiate engagement with the fixed contacts 60A and 61A as well as the fixed contacts 60B and 61B to allow electrical conduction between the fixed contacts 60A and 61A and also between the fixed contacts 60B and 61B. By detecting the conductive state of the fixed contacts 60A and 61A as well as the fixed contacts 60B and 61B, it is possible to detect a rotational position of the ring gear 46 or a rotational position of the sun gear 44, i.e., a rotational position of the motor output shaft 20.

After the insulated state or the conductive state is achieved as described above, it is not always necessary to electrically maintain the above-described insulated state or conductive state. For instance, it is possible to determine if the protruding section 52 has reached the specified angular position based on a trigger signal that is generated and detected when the moving contacts 50A and 50B engage the fixed contacts 60A and 61A as well as the fixed contacts 60B and 61B.

The position detector 30 further includes the pulse plate 192 as pulse generation means and a sliding contact 196 as pulse detection means.

The pulse plate 192 is a thin circular disc having the fitting hole 198 extending through its axial center. The fitting hole 198 is a cruciform-type through hole corresponding with the connection shaft 42 and the protrusions 45 of the connection shaft 42. The connection shaft 42 and the protrusions 45 are received in the fitting hole 198. A washer 220 is arranged adjacent the pulse plate 192 at the side opposite to the connection shaft 42 to hold the pulse plate 192 between the washer 220 and the connection shaft 42. The washer 220 has a through hole 222 corresponding with the sun gear 44 and also has the connection holes 224 corresponding with the protrusions 45 of the connection shaft 42. The sun gear 44 and the protrusions 45 are received in the through hole 222 and the connection holes 224, respectively. That is, the protrusions 45 of the connection shaft 42 are inserted through the fitting hole 198 of the pulse plate 192 and are received in the corresponding connection holes 224 of the washer 220. Then, a distal end of each protrusion 45 is caulked to the washer 220. Thus, the pulse plate 192 is secured to the connection shaft 42 (sun gear 44). As a result, the pulse plate 192 always rotates integrally with the connection shaft 42.

The pulse plate 192 further includes a conduction portion 194. The conduction portion 194 is formed along an outer peripheral edge of the pulse plate 192 and includes a ring-shaped first conduction portion 194A and a second conduction portion 194B disposed adjacent the first conduction portion 194A at radially outward thereof. The second conduction portion 194B has a series of pulse-shaped notches.

The sliding contact 196 is secured to the cover plate 36 at its base end and extends to the conduction portion 194 of the pulse plate 192. The sliding contact 196 has an input contact 196A and an output contact 196B. The input contact 196A always engages the first conduction portion 194A of the conduction portion 194, and the output contact 196B engages the second conduction portion 194B of the conduction portion 194. With this arrangement, pulse signals can be generated and detected as the pulse plate 192 rotates. The detected pulse signal is used in the position control of a moving body (the window glass).

The conduction portion 194 is not necessary formed on the top side of the pulse plate 192 but can be formed along an outer peripheral surface of the pulse plate 192. In such a case, the sliding contact 196 is secured to the cover plate 36 to face the outer peripheral surface of the pulse plate 192.

The protective plate 200 is disposed between the pulse plate 192 and the ring gear 46 (the flange portion 48). An outer peripheral edge of the protective plate 200 is securely held by the cover plate 36 to prevent the ring gear 46, the carrier 56 and other components from falling out of the cover plate 36. Furthermore, since the protective plate 200 is interposed between the pulse plate 192 and the ring gear 46 (flange portion 48), the protective plate 200 limits relative movements of the pulse plate 192 and the ring gear 46 so as not to contact the two parts with each other.

Figure 6:
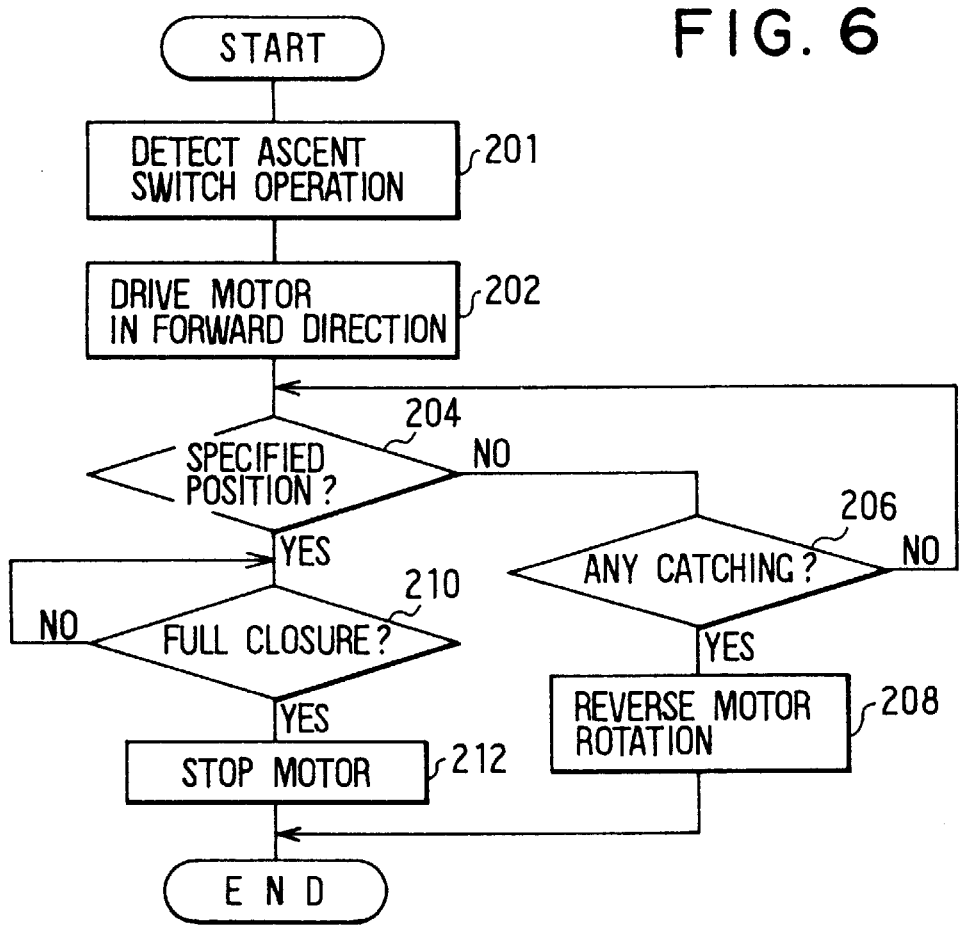
FIG. 6 is a flow chart illustrating a control process for moving a window glass upward upon activation of an ascent switch of the power window device to which the motor actuator of the present invention is applied.

The operation of this embodiment is described with reference to the flow diagram shown in FIG. 6 with respect to the case in which the window glass moves upward in response to the operation of an ascent switch of the power window device, for example.

In the above-described motor actuator M (the motor 10 and the position detector 30), when the activation (operation) of the ascent switch of the power window device is detected at step 201, the motor 10 is driven to rotate the motor output shaft 20 at step 202, so that the window regulator is actuated and the window glass is raised.

Normally (while the window glass moves upwardly), the carrier 56 is urged by the spring washer 58 against the protective plate 200 and is thereby held stationary, so that the revolution of each planetary gear 54 around the sun gear 44 is prevented. Thus, when the motor output shaft 20 is rotated, the rotation of the connection shaft 42 (that is, the sun gear 44) is decelerated through the planetary gears 54 and is transmitted to the ring gear 46. Thus, the ring gear 46 rotates at a slower speed in the forward direction A.

Next, at step 204, it is determined whether the specified rotational position of the motor 10 has been reached, i.e., whether the specified position (4 mm away from the upper stop position) of the window glass has been reached based on a signal transmitted from the position detector 30.

That is, in the position detector 30, when the motor output shaft 20 is rotated, the rotation of the connection shaft 42 (that is, the sun gear 44) is decelerated through the planetary gears 54 and is transmitted to the ring gear 46, so that the ring gear 46 rotates at the slower speed in the forward direction. If the window glass has not reached the position 4 mm below the upper stop position, the protruding section 52 is still apart from the protrusion 40, so that the moving contacts 50A and 50B are not engaged with the fixed contacts 60A and 61A as well as fixed contacts 60B and 61B. Based on this, the current rotational position of the motor output shaft 20 (the fact that the window glass has not reached the position 4 mm below the upper stop position) is detected. In such a case, control process moves to step 206 while continuously operating the motor 10. At step 206, it is determined whether any object is caught between the window glass and a window frame of the door based on, for example, a lock current of the motor 1o that is generated when the motor is locked. When it is determined that an object is caught between the window glass and the window frame of the door, the motor 10 is rotated in a reverse direction at step 208, so that the window glass moves downward. On the other hand, when it is determined that nothing is caught between the window glass and the window frame of the door at step 206, control process returns to step 204.

At step 204, if the window glass has reached the position 4 mm below the upper stop position, the protruding section 52 is still apart from the engaging position for a specified angular distance. At this position, the moving contacts 50A and 50B initiate the engagement with the corresponding fixed contacts 60A and 60B, respectively. As a result, the fixed contacts 60A and 60B are insulated by the moving contacts 50A and 50B. Based on this, the current rotational position (the fact that the window glass has reached the position 4 mm below the upper stop position) of the motor output shaft 20 is detected.

If it is determined that the specified rotational position of the output shaft 20 of the motor 10 has been reached, i.e., the specified position (4 mm away from the upper stop position) of the window glass has been reached at step 204, control moves to step 210 while continuously operating the motor 10. Although the moving contacts 50A and 50B are kept moving relative to the fixed contacts 60A and 60B as well as the fixed contacts 61A and 61B, the insulated state is maintained.

At step 210, it is determined whether the window glass is fully closed based on, for example, the lock current of the motor 10. If it is determined that the window glass is fully closed at step 210, control process moves to step 212 where the motor 10 is stopped, and the entire operation is terminated.

In the motor actuator M, when the pulse plate 192 of the position detector 30 is rotated, the engagement and the disengagement of the output contact 196B with the second conduction portion 194B of the conduction portion 194 are repeated, so that the pulse signals are generated and are detected. Thus, based on the detected pulse signal, the rotational position of the output shaft 20 of the motor 10 can be detected linearly. Thus, for example, if the motor actuator M is used in the power window device of a vehicle having a catch prevention function, the position of the window glass can be continuously and linearly detected and controlled.

According to the embodiment of the present invention, in the connection between the motor output shaft 20 and the connection shaft 42 used as the sensor drive shaft in the motor actuator M, the connection shaft 42 is interfitted with the outer peripheral surface of the interfitting portion 23 of the motor output shaft 20. Also, the shaft portion 43 of the connection shaft 42 is interfitted with the inner peripheral surface of the motor output shaft 20. Furthermore, one of the radial recesses 25 of the motor output shaft 20 engages with the single radial projection 47 of the shaft portion 43 of the connection shaft 42. Thus, when one of the radial recesses 25 of the motor output shaft 20 engages with the single radial projection 47 of the shaft portion 43 of the connection shaft 42, the motor output shaft 20 and the connection shaft 42 are non-rotatably connected with each other. That is, at the interfitting connection between the motor output shaft 20 and the connection shaft 42, there is no need for a spline interfitting portions having a complicated shape, plural guide grooves nor plural guide projections. As a result, the process of manufacturing the interfitting connection structure can be more simplified, allowing reduction of the manufacturing costs. Also, it is not required to maintain the unnecessarily high precision of the interfitting positions of the motor output shaft 20 and the connection shaft 42 to prevent production of the defective motor output shaft 20 or the connection shaft 42 that cannot be properly interfitted with the corresponding connection shaft 42 or motor output shaft 20. This allows further reduction of the costs.

Since the axial distal end portion of the single radial projection 47 formed on the shaft portion 43 of the connection shaft 42 is tapered toward its axial distal end, the radial projection 47 can be easily and securely inserted into the radial recess 25 when the motor output shaft 20 is inserted into the connection shaft 42, that is, when the single radial projection 47 formed on the shaft portion 43 of the connection shaft 42 engages with the radial recess 25 formed in the motor output shaft 20. This allows achievement of more efficient connecting operation of the motor output shaft 20 and the connection shaft 42.

As described above, in the motor actuator M of the present embodiment, a position of the moving object, such as the window glass or the sunroof panel, can be detected with a high degree of accuracy. This is achieved by the simple structure at the lower costs. Furthermore, the need for high quality control of the engagement connection between the motor output shaft 20 and the connection shaft (sensor drive shaft) 42 is eliminated, so that the manufacturing and assembly of the motor output shaft 20 and the connection shaft 42 is eased, allowing reduction of the costs.

In the above-described embodiment, although the motor actuator M is applied to the power window device, the present invention is not limited to this and can be applied to any devices that move any object by a motor. For example, the present invention can be applied to the sunroof device that moves the sunroof panel or to a power seat device that moves a seat.

The present invention having been described hereinabove should not be limited to the disclosed embodiment but may be implemented in other ways without departing from the scope and spirit of the present invention.

What is claimed is:

1. A motor actuator comprising:
  a motor including a motor portion and a gear portion that are connected with each other, said gear portion having a motor output shaft for outputting a rotational force from said motor portion; and
  a rotational position detector for detecting a rotational position of said motor output shaft, said rotational position detector including an approximately cylindrical sensor drive shaft being coupled with said motor output shaft of said gear portion, wherein:
    said motor output shaft has an approximate cylindrical shape with an inner peripheral surface defining an insertion hole into which a shaft portion of said sensor drive shaft is inserted;
    said motor output shaft has a plurality radial recesses on the inner peripheral surface, wherein each of the plurality of radial recesses extends in an axial direction of said motor output shaft; and
    said sensor drive shaft has a radial projection that protrudes from an outer peripheral surface of said shaft portion for engaging with said radial recess of said motor output shaft, wherein said radial projection is further for engaging with only one of said plurality of radial recesses; and
    said motor output shaft and said sensor drive shaft are connected with each other to prevent a rotation therebetween by an engagement of said one of said plurality of radial recesses of said motor output shaft with said radial projection of said sensor drive shaft.

2. The motor actuator according to claim 1, wherein an axial end portion of said radial projection is tapered toward its axial end.

3. The motor actuator according to claim 1, wherein said radial projection is axially elongated.

4. The motor actuator according to claim 1, wherein said sensor drive shaft has a generally circular concave portion into which an outer peripheral surface of said motor output shaft is rotatably inserted.

5. The motor actuator according to claim 1, wherein said rotational position sensor further includes a pulse plate for generating a pulse and a sliding contact for detecting the pulse.

6. A motor actuator comprising:
  a motor;
  a housing that accommodates an output mechanism driven by said motor and an output shaft transmitting a driving force from said output mechanism; and
  a rotational position sensor for detecting a rotational position of said output shaft, said rotational position sensor having a sensor drive shaft connecting to said output shaft, wherein:
    said output shaft has a cylindrical portion with an outer peripheral surface and an inner peripheral surface; said cylindrical portion has a plurality of recess parts on said inner peripheral surface, wherein each of said plurality of recess parts extends in an axial direction of said output shaft; and
    said sensor drive shaft includes
      a generally circular concave portion into which said outer peripheral surface of said output shaft is rotatably inserted,
      a shaft portion being inserted into said inner peripheral surface of said output shaft,
      a radial projection protruding from an outer peripheral surface of said shaft portion for engaging with said radial recess of said output shaft, wherein said radial projection is for engaging with only one of said plurality of recess parts; and
      an outer peripheral portion rotatably received in said housing through a shaft hole of a metal plate of said housing.

7. The motor actuator according to claim 6, wherein an axial end portion of said radial projection is tapered toward its axial end.

8. The motor actuator according to claim 6, wherein said radial projection is axially elongated.

9. The motor actuator according to claim 6, wherein said rotational position sensor further includes a pulse plate for generating a pulse and a sliding contact for detecting the pulse.

* * * * *